United States Patent

Court

[15] 3,650,107

[45] Mar. 21, 1972

[54] POWER TRANSMISSION

[72] Inventor: Kenneth Court, Detroit, Mich.

[73] Assignee: Sperry Rand Corporation, Troy, Mich.

[22] Filed: Aug. 12, 1970

[21] Appl. No.: 63,137

[52] U.S. Cl. ............................60/53 R, 60/52 VS, 60/DIG. 5
[51] Int. Cl. ...........................................F15b 15/18
[58] Field of Search ................60/52 VS, 53 R, 53 A, DIG. 5

[56] References Cited

UNITED STATES PATENTS

| | | | |
|---|---|---|---|
| 3,126,707 | 3/1964 | Hann et al. | 60/53 A |
| 3,238,723 | 3/1966 | Young | 60/53 A |
| 3,376,703 | 4/1968 | Buczynski | 60/53 R |
| 3,383,857 | 5/1968 | Rajchel et al. | 60/53 A |
| 3,561,212 | 2/1971 | Pinkerton et al. | 60/53 A |

Primary Examiner—Edgar W. Geoghegan
Attorney—Van Meter and George

[57] ABSTRACT

A hydrostatic variable speed and reversible power transmission especially suited for driving mobile equipment has a variable displacement pump with a uni-directional delivery and a variable displacement and reversible hydraulic motor with a single high-pressure delivery line. Coordinated control of the pump and the motor is obtained by a manual control lever shiftable in a U-shaped pattern to progressively increase the transmission speed ratio forwardly when moved up one leg of the U and reversely when moved up the other leg of the U. A followup servomotor controls the displacement of the driving motor, utilizing a feedback mechanism which is sensitive only to the magnitude of the motor displacement and not to its direction. A pilot valve responsive to shifting of the control handle from one leg to the other of the U reverses the action of the servovalve upon the displacement varying mechanism of the driving motor, and when in mid position serves as an anti-creep bypass.

13 Claims, 6 Drawing Figures

INVENTOR.
KENNETH COURT

INVENTOR.
KENNETH COURT
BY
ATTORNEYS

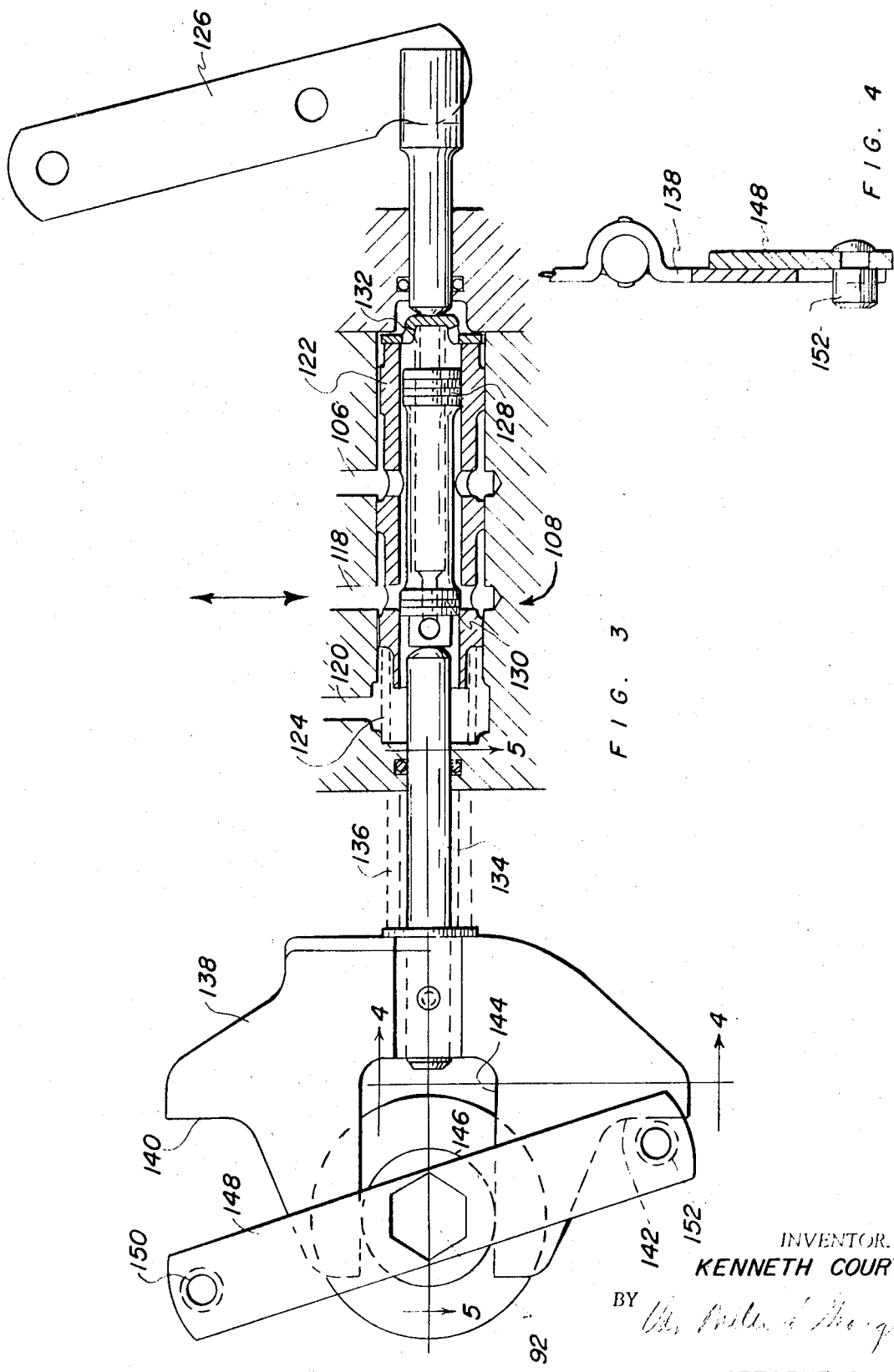

POWER TRANSMISSION

Hydrostatic power transmission are widely used for purposes such as vehicular drives where the advantage of continuously variable speed ratio is required. Such transmissions utilize a variable displacement hydraulic pump connected by fluid conduits to a hydraulic motor which may either have a fixed displacement or have its displacement variable from maximum down to a minimum below which the motor will not operate efficiently or even at all. Reversibility has heretofore been obtained either by the use of a reversible variable displacement pump or by the use of a four-way reversing valve in the conduits between the pump and motor. In both instances, the motor is uni-directional; by which is meant that its shaft rotation is reversed only by reversing the direction of fluid flow through the motor.

The design of hydrostatic transmissions of this character presents certain problems in achieving proper control. Where the pump is of a reversible type, it is essential to avoid creeping when the control is in neutral and special provisions have to made for this purpose. These usually introduce undesirable control problems in achieving smooth starts. Where a four-way reversing valve is used, coordination between the valve and the pump displacement controls becomes complicated and likewise it is difficult to achieve smooth start-up. Such transmissions furthermore require high pressure design for the conduits on both sides of the transmission and utilize duplicate relief valves as well as a pair of replenishing check valves for the charging pump with which such transmissions are usually equipped. A further problem arises in providing suitable heat exchanging means and filtering means in such transmissions since equipment of this type which is located in one of the main transmission conduits must be capable of withstanding full pressure and also must be operative for reverse flow; or else resort must be had to filtering and cooling only that portion of the circulating fluid which passes through the charging pump.

It is an object of the present invention to provide an improved hydrostatic transmission of the reversible variable speed type in which both the pump and the motor displacements may be varied selectively and in which reversibility is achieved at the motor while allowing only uni-directional fluid flow through the pump and motor.

A further object is to provide an improved control system for a reversible hydraulic pump or motor in which opposed pistons of equal area are arranged so that one of them is subject to a biasing pressure at half level while the other is under the control of a servovalve, and to provide for reversing the relationship of the two pistons to the biasing pressure and the servovalve respectively.

It is another object of the present invention to provide a hydrostatic transmission of the reversible variable displacement type especially suited for vehicular drives and in which control of both the pump and motor displacement as well as motor reversibility is achieved from a single control handle movable in a simple, easily understood pattern.

The foregoing disadvantages are eliminated and the above objects are achieved by the present invention which consists in a hydrostatic variable speed and reversible power transmission comprising a uni-directionally driven variable displacement pump, means for controlling the pump to deliver fluid in a single direction only and at selectively variable rates, a single continuous high pressure delivery conduit extending from the pump, a motor of the reversible variable displacement type forming the terminus of the delivery conduit, a return fluid system connected to the motor outlet and to the pump inlet, and a combined displacement and direction control system for the pump and the motor including means for holding the pump at or near zero delivery and the motor at maximum delivery for transmission neutral, and which is operable to first increase the pump displacement and then reduce the motor displacement to increase the transmission output speed, together with means for reversing the operation of the control means upon the motor without reversing the direction of flow through the motor.

Another aspect of the invention consists in a variable displacement, reversible hydraulic pump or motor comprising a member shiftable in opposite direction from a central neutral position, a pair of pistons of equal area, one for shifting the member in each direction, a servovalve for controlling the admission and release of fluid pressure at one piston while the other piston is subjected continuously to pressure at a level substantially half that available to actuate the other piston together with means for reversing the piston connections relative to the servovalve and the half level pressure.

A further aspect of the invention consists in a variable displacement, reversible hydraulic pump or motor comprising a member shiftable in opposite directions from a central neutral position, a servomotor means for shifting the member to any position between full forward displacement and full reverse displacement, a servovalve having a selectively operable input member shiftable only from neutral to full displacement, followup means responsive to the shifting of the member away from neutral and nonresponsive to the direction of such shifting, and means effective only when the input member is at neutral for reversing the effect of the servovalve upon the servomotor. In the drawings:

FIG. 3 is a fragmentary view showing a motor control mechanism and followup servovalve incorporated in the transmission of FIG. 1.

FIG. 4 is a fragmentary sectional view on line 4—4 of FIG. 3.

Figure 1:
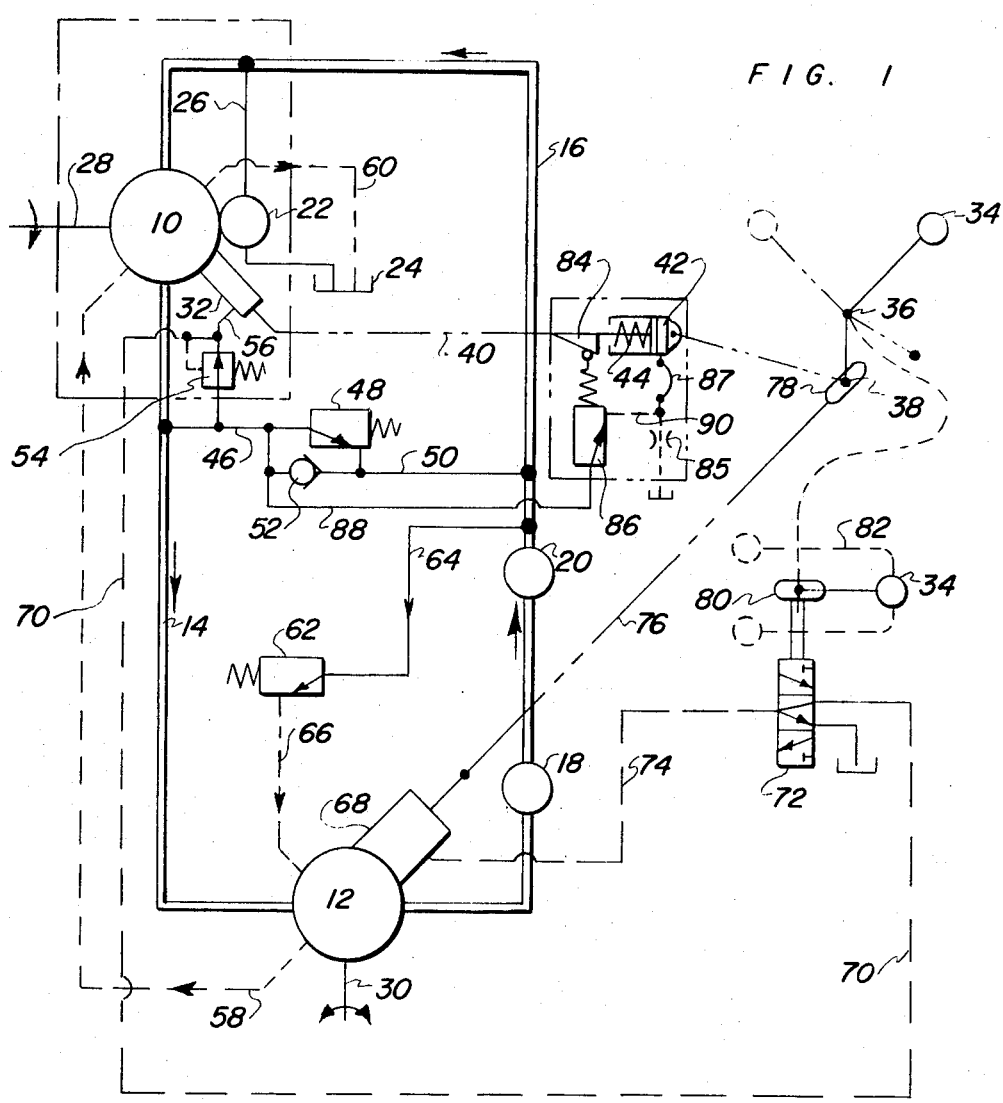
FIG. 1 is a diagrammatic view of a hydrostatic power transmission incorporating a preferred form of the present invention.
Figure 5:
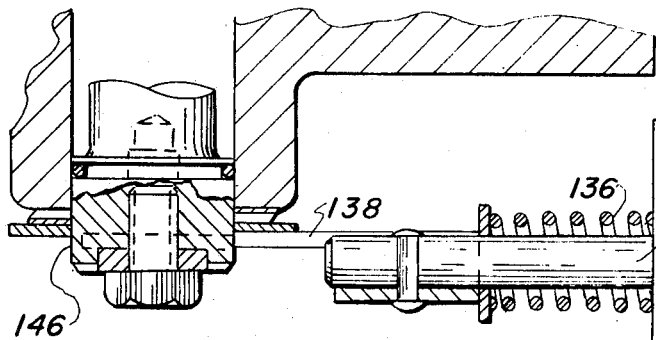
FIG. 5 is a fragmentary sectional view on line 5—5 of FIG. 3.
Figure 2:
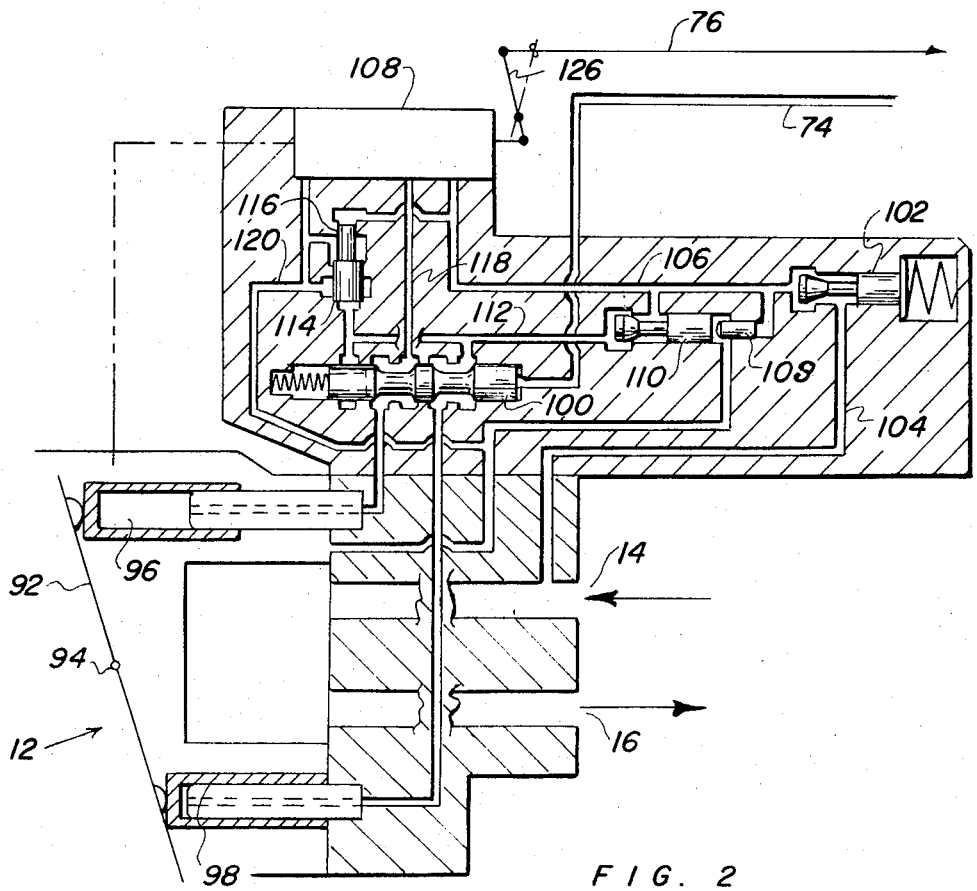
FIG. 2 is a hydraulic circuit diagram illustrating a portion of the control system incorporated in the transmission of FIG. 1.

Referring to FIG. 1, the improved hydrostatic transmission includes a pump 10 and a motor 12 which are connected by a single continuously open high pressure delivery line 14 and by a return system including the main low pressure return line 16. The return system may include a heat exchanger 18 and a filter 20. The return system also includes a charging pump 22 which withdraws fluid from a reservoir 24 and delivers it through a conduit 26 to the inlet of the pump 10. Pump 10 is driven from any suitable prime mover by a shaft 28 and motor 12 has an output shaft 30 which may be connected to a suitable propulsion drive or other load which requires driving at continuously variable speed ratios in either direction.

The pump 10 may be of any well known variable displacement type such as a variable stroke piston pump and need not be arranged for reversible delivery. A typical pump for the purpose is illustrated in the patent to Keel, U.S. Pat. No. 2,870,746, in which the member 42 is shiftable to vary the pump displacement by means of a servomotor 44—46—48. Such a servomotor is indicated diagrammatically at 32 in FIG. 1. Control of the servomotor is exercised by means of a manual control lever 34 pivoted at 36 and rigid with a crank 38 to which a link 40 is connected. The link 40 contains a lost motion connection 42, in the form of a piston and cylinder, which is biased by a spring 44 to take up the lost motion so long as the crank 38 does not move toward the right beyond the limit of rightward travel of the servomotor 32. When crank 38 reaches such a point, spring 44 begins to compress and further travel of the control lever 34 is thereby permitted. In its leftmost position as illustrated, crank 38 holds the servomotor 32 at or near a position of zero displacement for the pump 10. This position is not critical and may lie a small distance on either side of the true neutral position of the pump 10 without causing creep of the transmission as will later be described.

Tapped off from the high pressure delivery conduit 14 is a branch 46 leading to a high pressure overload relief valve 48 of any suitable form. Discharge from the valve 48 is carried by a line 50 into the return system 16. Connected in shunt across the relief valve 48 is a check valve 52 opening to flow from the return system into the delivery line 14 under certain conditions. A pressure reducing valve 54 receives fluid from the line 46 and supplies it through a line 56 to the servomotor 32. A seepage line 58 extends from the casing of the motor 12 to the casing of the pump 10 and from thence to the reservoir 24 by a line 60. A relief valve 62, which is set to open at a very low pressure, is connected to the return system by a line 64 and discharges through a line 66 into the casing of the motor 12.

The motor 12 has a servomotor control indicated in FIG. 1 at 68. From the reducing valve 54, a line 70 leads to a small pilot reversing valve 72 and from thence to the servomotor 68 by a line 74. The servomotor 68 is also controlled by the manual control lever 34 through a link 76 which has a lost motion connection 78 with the crank 38. This lost motion connection is inoperative to move the link 76 until at or somewhat before the point where servomotor 32 reaches the end of its stroke and spring 44 starts to be compressed. Further movement of handle 34 and crank 38 in a counterclockwise direction results in shifting the servomotor 68 to decrease the displacement of motor 12 and thus in the well known manner increases the speed ratio beyond that obtained when the pump 10 and motor 12 are at full displacement.

The pilot valve 72 is connected by a Scotch yoke 80 with the control lever 34 in such a manner that the lever may be shifted from side to side to shift the pilot valve between its two extreme positions and the neutral position illustrated. The lever 34 may be guided by a U-shaped slot, such as indicated at 82, so as to shift the pilot valve 80 as it is moved across the base of the U and to shift the links 40 and 76, as previously described, when it is moved up either of the two legs of the U. The link 40 may also carry a cam 84 for controlling a variable pressure relief valve 86 which is connected to the branch 46 by a line 88 and delivers through a restrictor 85 and a line 90 back to the reservoir. A flexible line 87 feeds fluid also to the lost motion cylinder and piston 42 to lengthen the link 40 hydraulically. The cam 84 may thus allow relief of oil from the high pressure delivery conduit 14 at lower than the maximum overload pressure when the pump displacement is high. It thus serves as a horsepower limiting control by overriding the manual control when the latter demands to much power input to the pump 10.

Referring now to FIGS. 2 through 5, the construction of the servocontrol 68 for the motor 12 is there illustrated. Considering the motor 12 as having a displacement varying member such as the swash plate 92 pivoted at 94, it is arranged to be under the control of a pair of pistons 96 and 98 of equal area with the swash plate 92 being movable across center between full displacement forward and full, or lesser, displacement rearward. The pistons 96 and 98 are controlled by a spring biased four-way reversing valve 100 which in turn is controlled through the line 74 by the pilot valve 72. For one direction of rotation, e.g., forward, valve 72 is shifted downwardly to connect line 74 to the reservoir and permit valve 100 to occupy the position illustrated in FIG. 2. For reverse rotation, pilot valve 72 is raised to its upper position which admits fluid from the reducing valve 54 through lines 70 and 74 to the right end of valve 100 shifting it to the left against its spring bias.

A local reducing valve 102 at the motor receives fluid from the delivery line 14 through a branch 104 to deliver it through a line 106 to the followup servovalve 108, later to be described. This supply of control fluid at reduced pressure also operates upon a small piston 109 which biases a second reducing valve 110 to supply a further reduced pressure to the outside ports of reversing valve 100 through line 112. The area of small piston 109 relative to the spool of valve 110 is approximately one-half so that the outlet pressure supplied through line 112 is substantially half that supplied by the local reducing valve 102. This half level pressure is supplied to either piston 96 or piston 98 resulting in a constant bias on such piston 96 or piston 98 resulting in a constant bias on such piston. Line 112 may also be regulated to half level pressure by a relief valve 114 having a small piston 116 subjected to the outlet pressure from local reducing valve 102.

The central port of reverse valve 100 is connected by a line 118 with the followup servovalve 108 for the purpose of supplying or exhausting fluid to and from, whichever of the pistons 96 or 98 is connected to the line 118. For this purpose, servovalve 108 receives reduced pressure through line 106 and exhausts fluid to the casing of the motor 12 through line 120.

Referring now to FIG. 3, the followup servovalve 108 and its operating mechanism are there illustrated. The servovalve 108 has a sliding sleeve 122 biased to the right by a spring 124 and operated by a lever 126 which is connected to the link 76 of FIG. 1. In moving to the left, sleeve 122 maintains the connections with the supply port 106, the exhaust port 120 and the controlled port 118 which are illustrated in FIG. 3. Within the sleeve 122 is a feed-back spool 128 having a land 130 which, depending upon its position relative to sleeve 122, will connect controlled passage 118 either with supply 106 or with exhaust 120 or will block the same. Spool 128 is biased by a spring 132 toward the left in FIG. 3 and is operated by a plunger 134 which is biased to the left by a spring 136. Plunger 134 carries an operator 138 of the shape illustrated and has abutment ears 140 and 142. A slot 144 rides on a collar 146 (see FIG. 5) which is secured to the axis 94 of the swash plate 92 in FIG. 2. Also secured to the swash plate 92 is an arm 148 carrying a pair of abutment pins 150 and 152 which cooperate with the abutment surfaces 140 and 142. In neutral position, both of the pins 150 and 152 are just in contact with the abutments 140 and 142. When the swash plate is moved off from neutral in either direction, the operator 138 will be shifted to the right in FIG. 3.

In the position there illustrated, the motor is at maximum displacement, which position is achieved by complete release of the link 76 in FIG. 1. The servovalve has opened the controlled passage 118 to the supply passage 106 admitting control pressure fluid to the piston 96 and holding the swash plate 92 at its maximum displacement position. When the link 76 is pulled upwardly in FIG. 1, sleeve 122 will be pushed to the left in FIG. 3 opening the controlled passage 118 to the exhaust passage 120 and allowing the half level pressure at the piston 98 to push the swash plate toward a position of lesser displacement. Feed back is through the rod 134 and spool 128, thus cutting off this flow when the swash plate achieves the desired position.

In operation, with the system filled with fluid and pump 10 being driven by its prime mover, the speed and direction of the output shaft 30 of the motor is controlled by operation of the hand lever 34. In the neutral position illustrated in FIG. 1, the pump is at or very near its neutral position and pilot valve 72 is in its centered position. The servomotor 68 for the motor 12 maintains the latter at maximum displacement position as illustrated in FIG. 3. Any small flow of fluid which might be delivered by pump 10 into conduit 14 passes through reducing valve 54, which will be wide open, line 70 and pilot valve 72 to the reservoir. The deliver of charging pump 22 passes into the return system 16 and through line 64 and low pressure relief valve 62 to line 66, casing of motor 12, line 58, casing of pump 10, and line 60 to the reservoir. Alternatively, under these conditions it can pass through line 50, check valve 52, line 46, reducing valve 54, which will be wide open, line 70, and pilot valve 72 to reservoir. Under these conditions there is no tendency for the motor 12 to creep should the pump 10 be off neutral a little bit in the forward direction. Likewise, if it should be off neutral in the reverse direction a small amount, this flow will join the flow from the charging pump 22 on its way to the reservoir. Thus, it is unnecessary that precise adjustment of the neutral position of pump 10 be achieved each time the servomotor 32 moves to neutral.

To start the drive of the motor 12 forwardly, the lever 34 is shifted laterally to one of the legs of the U-shaped slot 82 and moved up that leg to any desired distance. As previously described, this motion of the lever 34 will act through the links 40 and 76 to first increase the displacement of the pump and then reduce the displacement of the motor 12 during the latter part of the available motion of lever 34. At the beginning of this motion, pilot valve 72 shifts off from its center position and blocks flow through the no-creep bypass 70, etc., except that the bypass through line 64 and low pressure relief valve 62 is not affected. This maintains a low control pressure in the return system 16. It should also be noted that since both the servomotors 32 and 68 are supplied from the delivery line 14 through their respective reducing valves 54 and 102, they will automatically take the first flow delivered by pump 10 in the event that either servomotor should have drifted away from its intended neutral position. Thus, before the motor 12 can start to drive, the servomotors controlling the displacements of the pump 10 and motor 12 will be operated to bring them into correct position. The ratio between the input shaft 28 and output shaft 30 may be set to any desired value and changed at will by merely moving the lever 34 along one leg of the U-shaped slot 82.

To initiate a reversal in direction, lever 34 is moved back to the base of the U and shifted laterally and then upwardly along the opposite leg of the U. This shifts the pilot valve 72 and the reversing valve 100 in FIG. 2 to change the relationship between the control pistons 96 and 98 and the servomotor 108 as well as with the half level pressure supply 112. The feedback mechanism including the operator 138 at the servomotor 68 responds in the same manner except that instead of the abutments 142 and 152 being in engagement, the abutments 140 and 150 will be in engagement. This changeover takes place as the reverse valve 100 shifts. If, in making a shift to reverse, or from reverse to forward, the momentum of the load connected to motor shaft 30 is sufficient to continue driving the motor, it will when reversed, start delivering fluid reversely into the high pressure delivery line 14. Under these circumstances, relief valve 48 receives both the output of the pump 10 and this reverse delivery from motor 12 until the drive shaft 30 stops.

Figure 6:
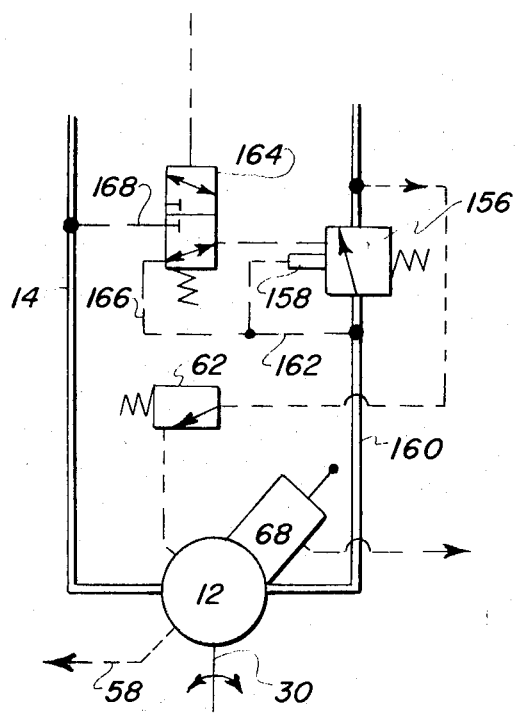
FIG. 6 is a fragmentary circuit diagram of a modified form of the transmission illustrated in FIG. 1.

In the circuit shown in FIG. 1, the motor is permitted to freely overrun or to coast when the control lever 34 is in neutral. If it is desired to have optional braking, the circuit shown in FIG. 6 can be utilized. In this case, the braking valve 156 is a pilot operated relief valve having a small piston 158 subjected to pressure in the return line 160 through a branch 162. The heat exchanger 18 and filter 20 are not illustrated in FIG. 6. Thus, the valve 156 serves to impose a predetermined back pressure load on the fluid discharging from the motor 12 for the purpose of braking the load connected to shaft 30. An operator's control valve 164 is supplied for the purpose of giving modulated braking effect. This selectively connects the large piston area of relief valve 156 either with the motor outlet line 160 through a branch 166 or with the motor inlet line 14 through a branch 168. In its spring biased position illustrated, valve 164 will allow the vehicle to coast since both piston areas of valve 156 are subject to the pressure in line 160 and the valve easily opens at a very low pressure value. When, however, control valve 164 is shifted, the piston 158 alone is subject to motor outlet pressure and this pressure may be supplemented to any desired degree by motor inlet pressure introduced through line 168 and valve 164 to the large piston area of valve 156. Thus, the operator may choose between a coasting condition and any degree of modulated braking effect.

I claim:

1. A hydrostatic variable speed and reversible power transmission comprising a uni-directionally driven variable displacement pump, means for controlling the pump to deliver fluid in a single direction only and at selectively variable rates, a single continuous high pressure delivery conduit extending from the pump, a motor of the reversible variable displacement type forming the terminus of the delivery conduit, a return fluid system connected to the motor outlet and to the pump inlet, and a combined displacement and direction control system for the pump and the motor including means for holding the pump at or near zero delivery and the motor at maximum delivery for transmission neutral, and operable to first increase the pump displacement and then reduce the motor displacement to increase the transmission output speed, and means for reversing the operation of the control means upon the motor without reversing the direction of flow through the motor.

2. A transmission as defined in claim 1 wherein the control means includes a single crank, a first link between the crank and the pump, a second link extending, at a large angle from the first link, between the crank and the motor, lost motion connections in each link, and resilient means giving priority of output motion to the first link whenever the crank is moved away from the neutral position.

3. A transmission as defined in claim 1 wherein the control system includes a followup servomotor for the pump and a followup servomotor for the motor, each servomotor having a range of motion equivalent to shifting between zero and full displacement only.

4. A transmission as defined in claim 1 which includes a charging pump connected directly to the inlet of the first pump with no intervening valving.

5. A transmission as defined in claim 1 wherein the return fluid system includes a heat exchanger connected to carry the entire return flow from the motor.

6. A transmission as defined in claim 1 wherein the return fluid system includes a filter connected to carry the entire return fluid flow from the motor.

7. A transmission as defined in claim 1 wherein the control system utilizes fluid delivered by the pump to operate the motor control means, whereby the motor is shifted from neutral to full displacement before the motor is driven.

8. A transmission as defined in claim 1 wherein the control system includes a bypass for the charging pump when the control is in neutral.

9. A transmission as defined in claim 1 wherein the control system includes a bypass for fluid delivered by the pump at low displacement when the control is in neutral to prevent creep.

10. A transmission as defined in claim 1 wherein the control system includes a bypass for small reverse flows from the pump when the control is in neutral.

11. A transmission as defined in claim 1 which includes a single relief valve which opens out of the delivery conduit to the return system and is effective to carry excess fluid delivered by the pump when the motor is overloaded as well as to carry fluid delivered reversely by the motor when the control is suddenly reversed and the motor load continues forwardly under momentum.

12. A transmission as defined in claim 1 wherein the outlet from the motor includes a back pressure valve selectively responsive either to a substantially high motor outlet pressure for braking purposes or to a substantially low motor inlet pressure for coasting purposes.

13. A transmission as defined in claim 12 wherein the back pressure valve is spring closed and has a pair of pistons of different areas effective to open the valve, the small area being connected to the motor outlet and the large area being connected to the motor inlet.

* * * * *